United States Patent [19]

DeBoer et al.

[11] Patent Number: 5,246,269
[45] Date of Patent: Sep. 21, 1993

[54] ARMREST

[75] Inventors: Gary T. DeBoer; Robert J. Niemiec; Garth D. Deur, all of Holland, Mich.

[73] Assignee: Prince Corporation, Holland, Mich.

[21] Appl. No.: 652,662

[22] Filed: Feb. 8, 1991

[51] Int. Cl.$^5$ ............................................. A47C 31/00
[52] U.S. Cl. ................................ 297/227; 297/194; 297/218; 297/411.46; 297/113
[58] Field of Search ............... 297/227, 194, 218, 411, 297/219, 113, 417

[56] References Cited

U.S. PATENT DOCUMENTS

| | | | |
|---|---|---|---|
| 2,477,898 | 8/1949 | Rehman et al. | 297/194 |
| 2,704,114 | 3/1955 | Williams | 297/194 |
| 2,841,212 | 7/1958 | De Vos et al. | 297/113 |
| 3,747,178 | 7/1973 | Harder, Jr. | 29/91 |
| 3,981,534 | 9/1976 | Wilton | 297/219 |
| 4,040,659 | 8/1977 | Arnold | 297/194 |
| 4,408,797 | 10/1983 | Franck et al. | 297/218 |
| 4,465,534 | 8/1984 | Zelkowitz | 156/91 |
| 4,789,201 | 12/1988 | Selbert | 292/218 |
| 4,844,546 | 7/1989 | Hanai | 297/416 |
| 4,865,383 | 9/1989 | Sbaragli et al. | 297/218 |
| 4,867,500 | 9/1989 | Oosterbaan et al. | 296/97 |
| 5,056,863 | 10/1991 | DeKraker et al. | 297/411 |

FOREIGN PATENT DOCUMENTS 3118176 12/1982 Fed. Rep. of Germany ...... 297/218

Primary Examiner—Kenneth J. Dorner
Assistant Examiner—Cassandra H. Davis
Attorney, Agent, or Firm—Price, Heneveld, Cooper, DeWitt & Litton

[57] ABSTRACT

A vehicle armrest includes a core having a pair of spaced generally parallel edges which receive fastening clips for attaching a strip of upholstery material to the core. In a preferred embodiment of the invention, the core includes a forwardly facing opening for receiving a drawer which includes a container holder.

20 Claims, 3 Drawing Sheets

5,246,269

ARMREST

BACKGROUND OF THE INVENTION

The present invention pertains to a vehicle armrest.

Vehicle armrests typically pivot between a raised stored position for utilization of vehicle seats for an additional passenger when an armrest is not needed and a lowered position for use as an armrest. Frequently such armrests include accessories such as cupholders and the like. Typically armrests are manufactured using a generally box-like polymeric frame which serves as a core to which foam padding is molded and which is upholstered with fabric, vinyl or leather to provide an appearance conforming to that of a vehicle.

The upholstering of such armrests typically encompasses all of the surfaces of the armrest to provide a fully enclosed armrest frame except when the armrest includes a front opening cupholder or the like. Typically a trim ring is employed to finish the interface of the upholstery material with any such openings. Although such armrests function adequately as armrests, the cost of upholstering and trimming such armrests can be excessive and it is difficult to provide a neat and trim appearance to the armrest.

SUMMARY OF THE PRESENT INVENTION

The armrest of the present invention, provides an economical trim appearing armrest by providing a unique core construction and upholstery system for the armrest which may accommodate accessories such as cupholders or the like.

In a preferred embodiment of the present invention, the armrest includes a core which includes a pair of spaced edges for receiving and attaching upholstery material to the core. The upholstery can be in the form of a strip with ends which can be attached by means of a fastener to the core edges such that the upholstery material can be wrapped around at least one major outer surface of the core to provide an armrest. In a preferred embodiment, the armrest core has opposite sides which define a channel into which the upholstery extends. In a preferred embodiment of the invention, the fastener is a snap-on clip to which the ends of the upholstery material are attached and which fits over the edges of the core. In another preferred embodiment of the invention, the core edges are spaced to define a recess for receiving accessories such as a cupholder or the like.

These and other features, objects and advantages of the present invention, will become apparent upon reading the following description thereof together with reference to the accompanying drawings in which:

DETAILED DESCRIPTION OF THE PREFERRED EMBODIMENT

Figure 1:
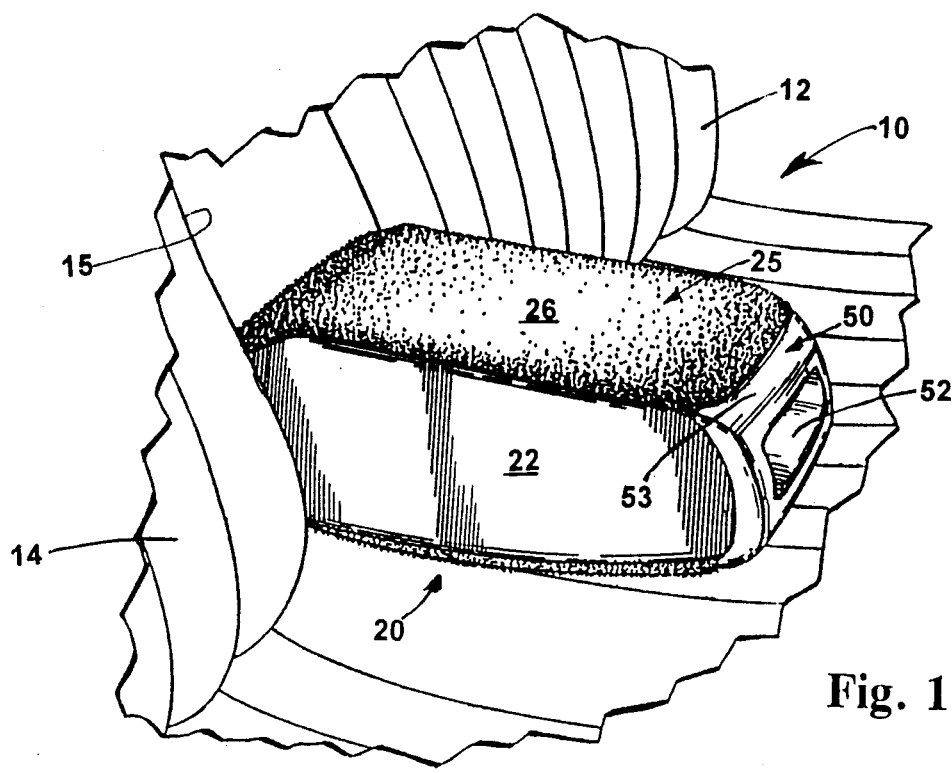
FIG. 1 is a perspective view of an armrest embodying the invention.
Figure 2:
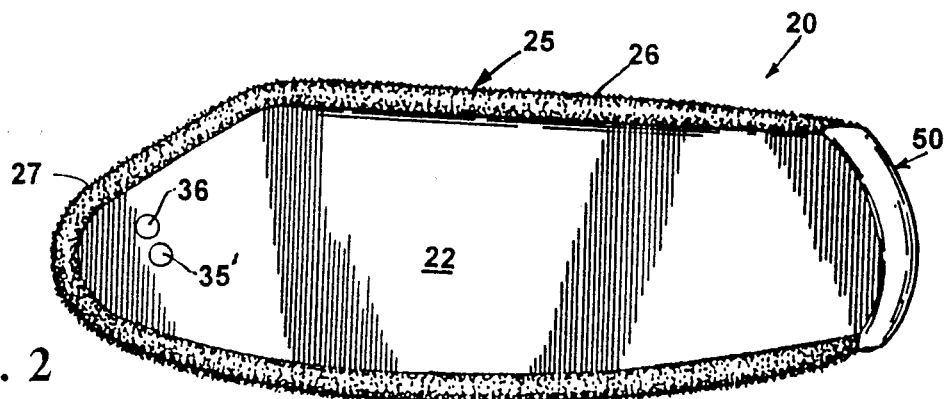
FIG. 2 is a right side elevational view of the armrest shown in FIG. 1.
Figure 3:
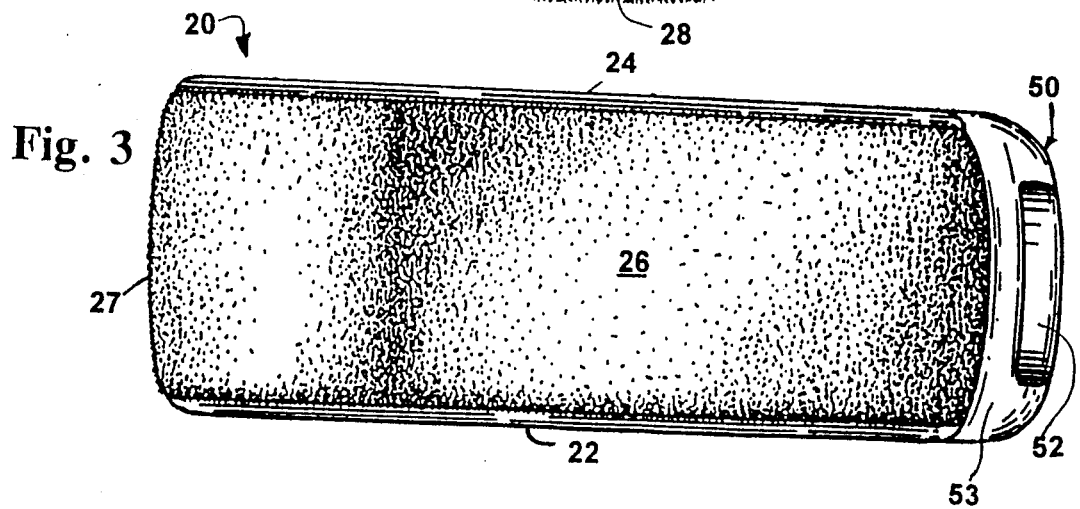
FIG. 3 is a top plan view of the armrest shown in FIG. 1.
Figure 4:
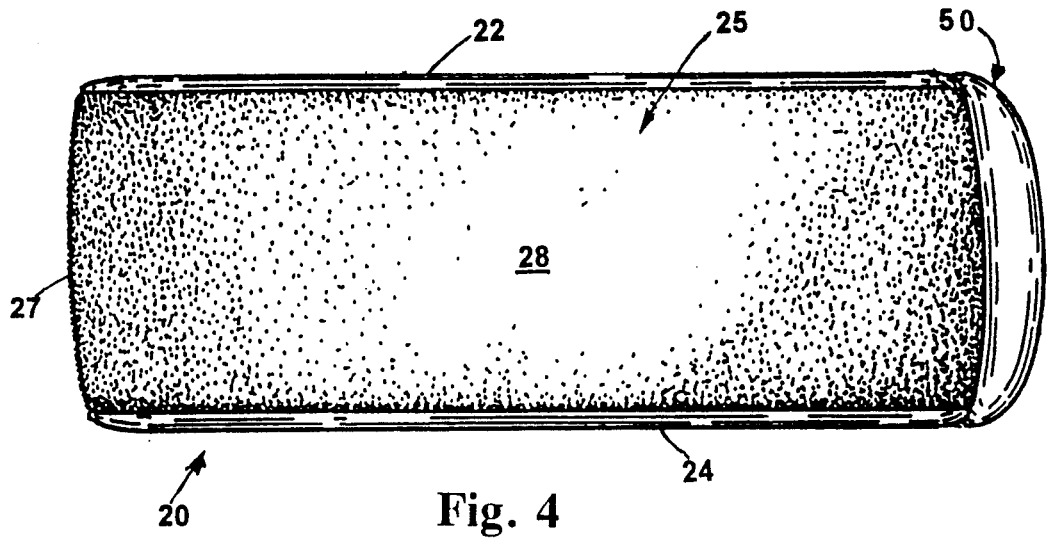
FIG. 4 is a bottom plan view of the armrest shown in FIG. 1.
Figure 5:
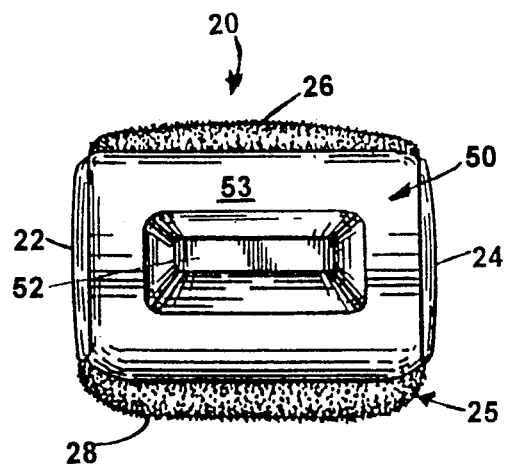
FIG. 5 is a front elevational view of the armrest shown in FIG. 1.

Referring initially to FIG. 1 there is shown a vehicle 10 and particularly the front seat area which includes a driver side seat 12 and a passenger side seat 14 between which there is mounted an armrest assembly 20 embodying the present invention. The armrest 20 is pivotally mounted such that it can be moved from a raised stored position within a recess 15 between the backs of seats 12 and 14 or to a lowered use position as illustrated in FIG. 1.

Armrest 20 includes a hard surface right side 22 which is the outer surface of the core of the armrest as described in connection with FIG. 7 below, a hard surface left side 24 and a continuous padded wraparound upholstery strip 25 extending between sides 22 and 24. In the preferred embodiment, the upholstery strip 25 extends within a channel in the core over a top 26 of the armrest 20, around a back 27 and over the bottom 28 as best seen in FIGS. 2-4, and 6. Thus a single strip of material can be employed to provide the upholstery section 25 covering the upper, lower and rear surfaces of the armrest. Extending outwardly from the front of the armrest is a cupholding drawer 50 including a recessed handle 52 for withdrawing drawer 50 from the armrest for access to a pair of cupholding support recesses 54 and 56 formed downwardly within the molded polymeric drawer 50 (FIG. 7) for use of the armrest for a cupholding function.

Drawer 50 is made of a rigid polymeric material such as ABS having a textured front surface 53 conforming to the texture, color and therefore appearance of sidewalls 22 and 24 of the armrest core which is also made of an ABS material. Thus the front and sides of armrest 20 present a textured hard surface which facilitates the durability of the armrest, particularly as it is moved between the use position shown and a stored position between seats 12 and 14. The relatively smooth hard surface sides 22 and 24 also facilitates movement of the armrest between the backs of seats 12 and 14 within recess 15. The upholstery material 25 is selected to provide a padded resting surface at the top, and a bottom surface 28 which matches the upholstery of seats 12 and 14 when in a raised stored position. The armrest thus provides an improved functional armrest with the same comforts as a conventional armrest but with easy operation due to lack of friction between upholstery fabrics of the seats and a conventional armrest while still providing the conventional comforts of a normal padded armrest.

The armrest construction is described in greater detail in connection with FIG. 7. The armrest 20 is formed in part of a central core made of a pair of core halves 30 and 32 which can be injection molded of a suitable polymeric material such as ABS or the like. Each core half includes a generally oval configuration as viewed from the side with a pair of curved inwardly facing spaced upper and lower flanges 31 and 33 respectively. The flanges are recessed below a peripheral lip 34 extending around the edge of the core members 30 and 32. The lip 34 defines a recess or channel 35 for receiving the upholstery strip 25. The facing curved edges 37 of flanges 31 and 33 respectively can include mating sockets for snap-fitting the core halves together or be flat with one set of flanges 31 and 33 being offset at ends 21 and 23 respectively as illustrated such that the two members can be fastened together such as by sonic welding or by fasteners such as rivets during the manufacture of the armrest.

Flanges 31 and 33 terminate at their forward edge in an upper and lower spaced edges 38 and 39 respectively which define generally horizontal edges when the two core halves 30 and 32 are joined and which receive the fastening means associated with the upholstery strip 25. Each of the core halves 30 and 32 further include an aperture 35' for receiving a pivot rod for pivoting the armrest when mounted to the vehicle through a suitable pivot mounting bracket (not shown) but of generally conventional construction. The core halves include a second aperture 36 for receiving a stop pin 36' to cooperate with the mounting bracket for limiting the upwardly raised stored position such that the lower surface 28 of the armrest is flush with the backs of seats 12 and 14. The inner surface of the core halves 30 and 32 in the preferred embodiment include a pair of generally horizontally extending vertically spaced rectangular tracks 40 and 42 defining drawer slides for drawer 50 which fits within the opening 60 defined by the vertical spacing between mating upper flanges 31 and lower flanges 33 and the sides 22 and 24 of the core halves.

The upholstery strip 25 comprises any desired upholstery material such as a foam backed fabric, vinyl, or leather which can be wrapped under at side edges 43 and 45 to provide a neat appearance with a width to snuggly fit between lips 34 when installed. Each of the ends 46 and 48 of the material 25 includes a generally J-shaped extruded mounting clip 60 of polymeric material having a base leg 62 and a curved end 64 to define the J-shaped member. Clip 60 is attached to the end 48 of member 25 as best seen in FIG. 7 by any suitable means such as a plurality of staples 65 spaced along the edge. The J-shaped clip is an extruded member which extends parallel to and adjacent the edge of opposite ends of strip 25 and together with the upholstery strip 25 is folded over 180 degrees from the position seen in FIG. 7 to the position as seen in FIG. 8 such that the curved open end 64 of the clip 60 compressibly engages the edge 39 defined by core halves 30 and 32. The strip 25 is then stretched over the remaining outer curved surface of the armrest with a similar J-shaped clip 60' at the upper edge 46 of the strip 25 being wrapped around and compressibly attached to edge 38. The upholstery strip is sufficiently elastic to allow the strip to be stretched for the mounting of the end clips 60 and 60' in the noted manner and remain sufficiently taut once installed to provide a neat appearing armrest as seen in the assembled views. This construction provides a finished appearance to the edge of the opening for the container holder drawer 50 without requiring a trim ring or other trim member.

Figure 6:
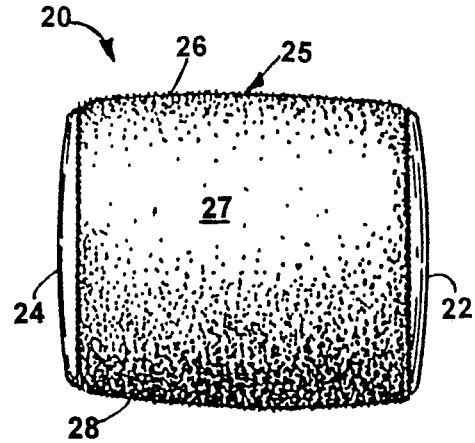
FIG. 6 is a rear elevational view of the armrest shown in FIG. 1.
Figures 7, 8:
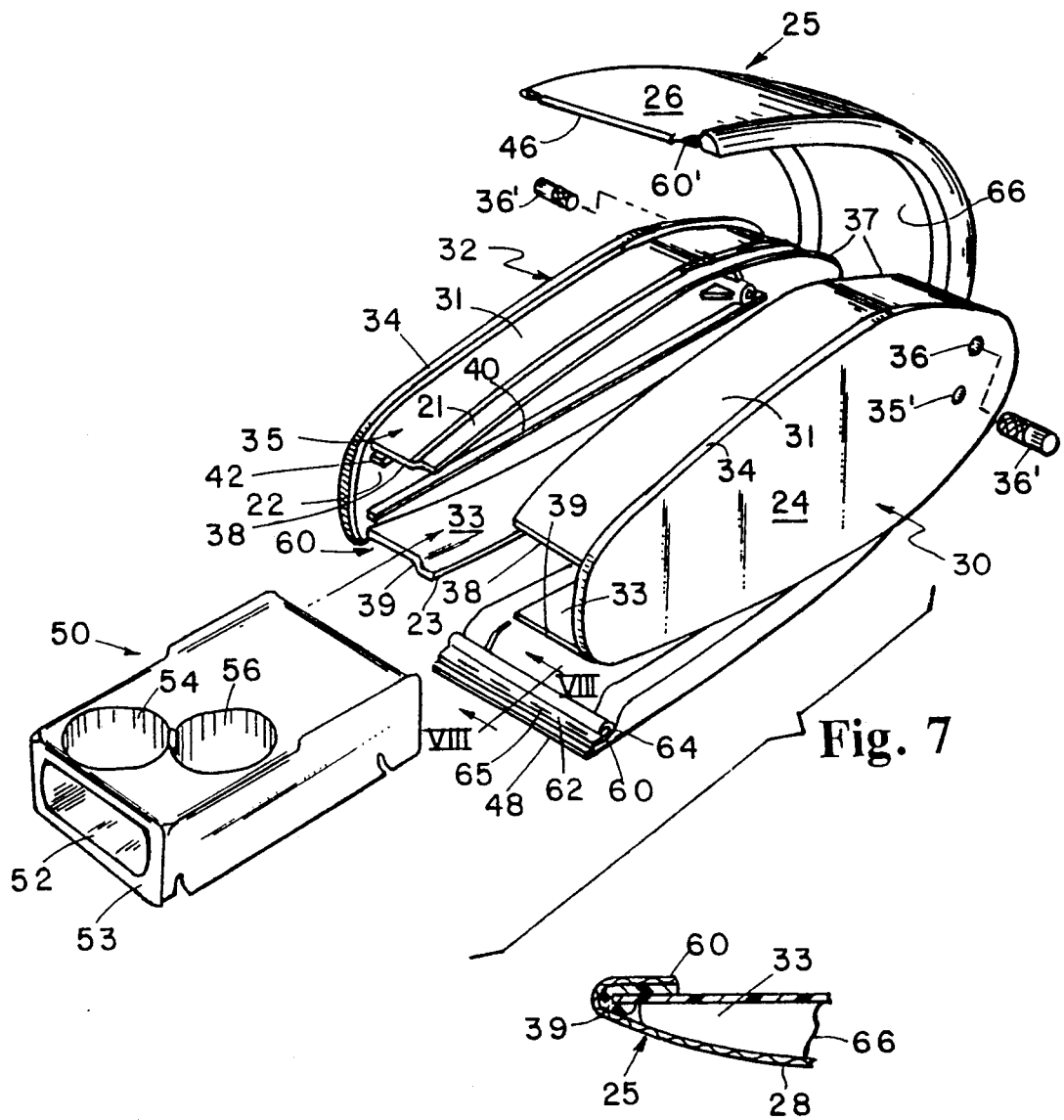
FIG. 7 is an enlarged exploded view of the armrest shown in FIG. 1.
FIG. 8 is an enlarged fragmentary cross-sectional view taken in the direction of arrow VIII in FIG. 7, once the armrest is assembled.

Underlying the upholstery strip 25 is foam padding material 66 which is tapered around its edges to provide a trim neat appearance to the armrest as best seen in FIGS. 1 and 6 and yet provides sufficient padding for the central upper surface 26 of the armrest to provide comfort for the user of the armrest.

Thus it is seen that with the armrest of the present invention, a relatively compact neat appearing armrest is provided with a unique system for providing trim upholstery thereto and further allow accessories such as a storage tray to extend from a forward edge of such armrest. The unique core construction which assures easy assembly and upholstery attachment structure results in an improved armrest construction which resists wear and is economical to manufacture.

It will become apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. An armrest comprising:
   a core defining a pair of edges extending in generally parallel spaced relationship to one another at one end of said core;
   upholstery material shaped to extend around at least a portion of said core with ends extending at least to said edges of said core wherein said core defines a channel extending between opposite sides of said core, and wherein said opposite sides of said core extend in general orthogonal relationship to said edges such that said upholstery material lies within said channel defined by said core; and
   means for fastening said ends of said upholstery material to said edges of said core for covering said portion of said core with said upholstery material and further including padding extending between said upholstery material and said core, wherein said means for fastening said ends of said upholstery material comprises clip means secured to each of said ends of said upholstery material and extending over each of said edges of said core.

2. The apparatus as defined in claim 1 wherein said clip means are generally J-shaped.

3. An armrest comprising:
   a core having a forward, rear, top, and bottom end including sidewalls defining a channel with spaced sides, said core further including edge means comprising a pair of edges extending in generally parallel spaced relationship, wherein said channel extends around the front, rear, and bottom end of said core and said edges are positioned at the forward end of said core;
   a strip of upholstery material shaped to extend around said core and between said sides of said channel said upholstery material having ends extending at least to said pair of edges of said core; and
   means for fastening said ends of said upholstery material to said edges of said core for covering said channel of said core with said upholstery material.

4. The apparatus as defined in claim 3 and further including padding extending between said upholstery material and said core.

5. The apparatus as defined in claim 4 wherein said means for fastening said ends of said upholstery material comprises clip means secured to each of said ends of said upholstery material and extending over each of said edges of said core.

6. The apparatus as defined in claim 5 wherein said clip means are generally J-shaped.

7. An armrest comprising:
   a core defining a pair of edges extending in generally parallel spaced relationship to one another at one end of said core, wherein said core defines a channel extending between opposite sides of said core and said opposite sides of said core extend in general orthogonal relationship to said edges, and wherein said edges of said core are shaped from one another to define an opening in said front end of said core;

upholstery material shaped to extend around at least a portion of said core and lie within said channel, said upholstery material having ends extending at least to said edges of said core, and padding extending between said upholstery material and said core; and generally J-shaped clip means secured to each of said ends of said upholstery material and extending over each of said edges of said core for covering said portion of said core with said upholstery material.

8. The apparatus as defined in claim 7 and further including a drawer slideably mounted to said core within said opening of said core for movement between a stored position within said core and a use position extended from said core.

9. The apparatus as defined in claim 8 wherein said drawer includes means for holding containers when extended from said core.

10. An upholstered vehicle accessory comprising:

a core including a channel extending over at least a top, rear, and bottom portion of said core, said core further including edge means at the ends of said channel and sidewalls extending on opposite sides of said channel;

a strip of upholstery material shaped to extend around at least said portion of said core to substantially fill said channel with opposite ends extending at least to said edge means of said core; and means for fastening only said opposite ends of said upholstery material to said edge means of said core for covering said portion of said core with said upholstery material.

11. The vehicle accessory as defined in claim 10 wherein said channel extends over the top and bottom of said core.

12. The vehicle accessory as defined in claim 11 wherein said fastening means comprises clip means.

13. The vehicle accessory as defined in claim 12 wherein said accessory is an armrest.

14. The vehicle accessory as defined in claim 13 wherein said core is molded of a polymeric material.

15. The vehicle accessory as defined in claim 14 wherein said core is molded in two mateable halves.

16. An armrest comprising:

a core including opposed spaced sides and a channel extending along at least a top and bottom of said core between said sides;

upholstery material shaped to fit within said channel; and means for fastening said upholstery material to said core and within said channel for covering at least a top and bottom of said core with said upholstery material.

17. The apparatus as defined in claim 16 wherein said channel extends continuously around one end of said armrest.

18. The apparatus as defined in claim 16 wherein said channel terminates at a front of said core, and wherein said core defines a pair of spaced generally parallel edges and said means for fastening said upholstery material fastens said material at said edges.

19. The apparatus as defined in claim 18 wherein said means for fastening said upholstery material comprises clip means secured to ends of said upholstery material and extending over each of said edges of said core.

20. The apparatus as defined in claim 19 wherein said clip means are generally J-shaped.

* * * * *